(12) United States Patent
Noguchi et al.

(10) Patent No.: US 6,504,574 B1
(45) Date of Patent: Jan. 7, 2003

(54) IMAGE SENSOR WITH SCAN DIRECTION SIGNAL CHARGE TRANSFER PARTS

(75) Inventors: Syun Noguchi, Mitaka (JP); Toshiro Kurosawa, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 09/149,658

(22) Filed: Sep. 9, 1998

(51) Int. Cl.$^7$ .......................... H04N 5/225; H04N 5/33
(52) U.S. Cl. ....................... 348/295; 359/368
(58) Field of Search ................... 348/294–295, 348/311, 315, 316, 317–320, 216, 216.1, 307, 308, 275; 358/482, 483; 359/368, 381, 385, 389; H04N 5/335

(56) References Cited

U.S. PATENT DOCUMENTS

| 4,985,758 A | * | 1/1991 | Hashimoto | .................. 348/316 |
| 5,027,226 A | | 6/1991 | Nagata et al. | |
| 5,969,759 A | * | 10/1999 | Morimoto | .................. 348/311 |
| 6,115,066 A | * | 9/2000 | Gowda et al. | .............. 348/308 |

OTHER PUBLICATIONS

Patent Abstract of Japan vol. 097, No. 008, Aug. 29, 1997.
Schlig, E S, "A 3072×32–Stage TDI Imaging Device", *IBM Journal of Research and Development*, vol. 35, No. 1/2, Jan./Mar. 1991, pp. 283–287.

* cited by examiner

*Primary Examiner*—Tuan Ho
(74) *Attorney, Agent, or Firm*—Oliff & Berridge, PLC

(57) ABSTRACT

A Time Delay Integration technique is applied to an image sensor of this invention. A sensor part is constructed in such a way that diagonally-arranged photo-sensors are arranged periodically lengthwise and widthwise. The signal charge read from the photo-sensors of each line is transferred vertically to horizontal CCD shift registers. Each horizontal CCD shift register is provided on each line of the diagonally-arranged photo-sensors, and the horizontal CCD shift register outputs the signal charge to an A/D converter, which converts the signal charge into a digital signal. Thus, one A/D converter processes only a small amount of data, and the object can be scanned at high speed.

4 Claims, 8 Drawing Sheets

IMAGE SENSOR WITH SCAN DIRECTION SIGNAL CHARGE TRANSFER PARTS

BACKGROUND OF THE INVENTION

1. Field of the Invention

The present invention relates generally to an image sensor, and more particularly to an image sensor that performs a Time Delay Integration (TDI) scanning at high speed.

2. Description of Related Art

A charge coupled device (CCD) line sensor is a one-dimensional sensor in which photo-sensors receiving image light are arranged in line. To image a two-dimensional image, the CCD line sensor or the object is moved so that the object can be imaged on a line-by-line basis. A scanner having the CCD line sensor is used in a copy machine and a product inspection machine, for example.

When the CCD line sensor captures the object that is moving at high speed, or when the CCD line sensor is moved at high speed to capture the object, the signal charge must be repeatedly accumulated and transferred at high speed on a line-by-line basis. Consequently, the signal charge can be accumulated for only a short period of time per line. For this reason, there is a problem in that a sufficient quantity of light is not obtained for imaging.

To solve this problem, a TDI sensor is used to scan the object at high speed. The TDI sensor is constructed in such a way that a plurality of CCD line sensors are arranged in a scan direction. The TDI sensor transfers signal charge accumulated in the CCD of each line to the CCD of the next line in synchronism with the movement of the image. Consequently, the signal charge is successively accumulated in the plurality of CCD line sensors, and the high-speed scanning can obtain a sufficient quantity of light for imaging.

The scan speed of the TDI sensor is limited. That is because there is a limit to a speed at which the signal charge accumulated in the CCD is shifted to the outside. Specifically, the signal charge accumulated in the CCD line sensors is finally discharged to the outside as serial analog signals, and an A/D converter converts the analog signals into digital signals. Owing to the limited processing capacity of the A/D converter, the scan speed is limited.

To raise the scan speed, one CCD line sensor is divided into a plurality of patches, and the signal charge accumulated in each patch is discharged as serial analog signals, which are converted into digital signals by each of a plurality of A/D converters provided for each patch. In this case, however, there is a limit to the width that can be divided into patches, and therefore, the scan speed cannot be raised sufficiently.

SUMMARY OF THE INVENTION

The present invention has been developed in view of the above-described circumstances, and has as its object the provision of an image sensor that realizes a high-speed scanning.

To achieve the above-mentioned object, the present invention is directed to an image sensor comprising: a light receiving part having photo-sensors, the photo-sensors receiving object light and converting the object light into signal charge, the photo-sensors being arranged in a plurality of lines in a line direction and being arranged in a plurality of lines in a scan direction perpendicular to the line direction; a plurality of scan direction signal charge transfer parts for transferring the signal charge, read from the photo-sensors, in the scan direction in accordance with a scan speed and accumulating the signal charge representing the same image read from the photo-sensors in the same line, each of the scan direction signal charge transfer parts being provided for each line of the photo-sensors in the scan direction; a plurality of line direction signal charge transfer parts for transferring the signal charge, transferred through the scan direction signal charge transfer parts, in the line direction, each of the line direction signal charge transfer parts connecting with every a predetermined number scan direction signal charge transfer parts; a plurality of digitizing parts for converting a plurality of signal charge lines, transferred through the line direction signal charge transfer parts, to digital signals; and an image signal producing part for producing image signals according to the digital signals output from the digitizing parts.

According to the present invention, the signal charges are read from the photo-sensors and are transferred in the scan direction in accordance with the scan speed, and the signal charges read from the photo-sensors on the same line, which represent the same image, are accumulated. The signal charges of every the predetermined number lines in the line direction are sequenced in a signal charge line in the line direction. The signal charge lines are transferred in the line direction, and are separately converted to the digital signals, from which the image signals are generated.

Thus, the signal charge line representing the image of one line can be converted into the digital signal by a plurality of processing circuits. For this reason, one processing circuit processes only a small amount of data, and the object can be scanned at high speed.

The photo-sensors are arranged at intervals of more than predetermined distance at the light receiving part, and the light receiving surface of each photo-sensor can be enlarged by shifting the peripheral circuits. As a result, the light receiving surface can receive a large quantity of light.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
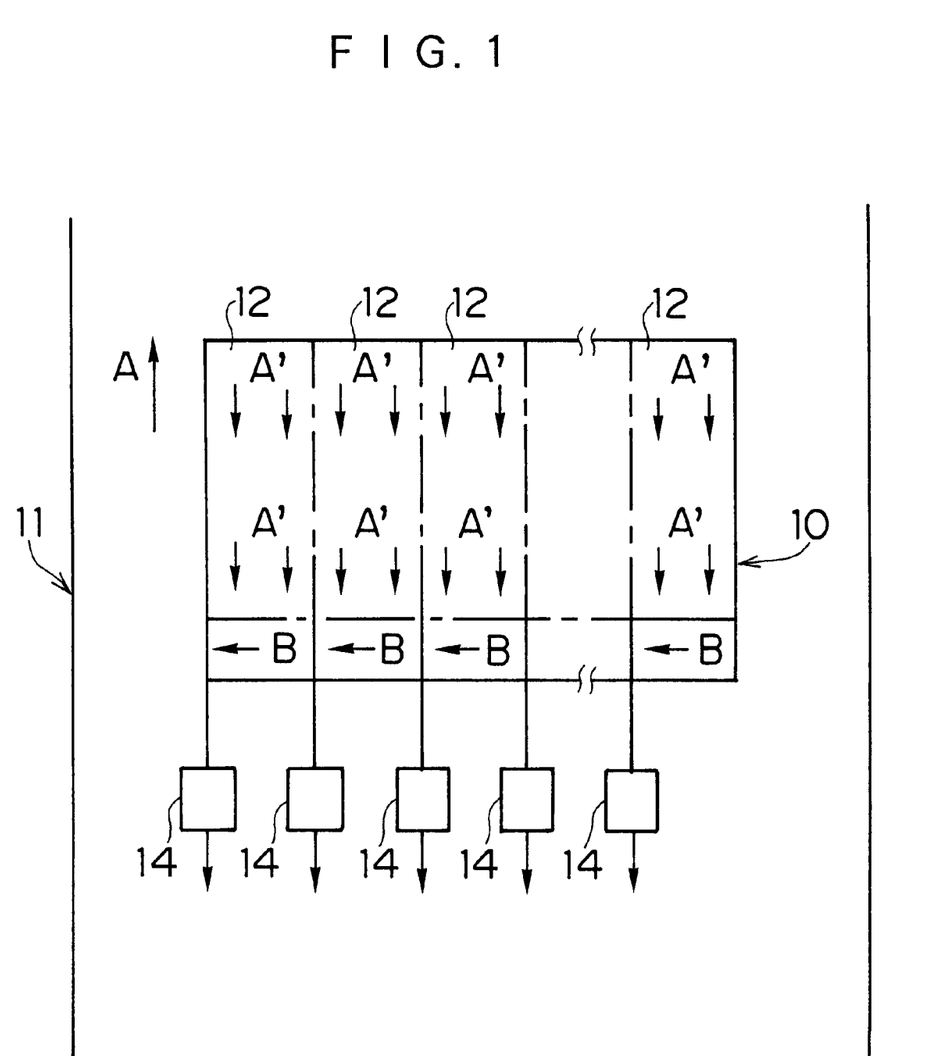
FIG. 1 is a view illustrating the structure of a sensor part of an image sensor according to an embodiment of the present invention.

FIG. 1 shows the structure of a sensor part in an image sensor according to an embodiment of the present invention. The technique of the TDI scanner sensor is applied to the sensor part 10, and the sensor part 10 is a circuit board on which photo-sensors are arranged in a plurality of lines. As shown in FIG. 1, the sensor part 10 moves upward in the drawing with respect to an object 11 (in a direction indicated with an arrow A), and scans an image of the object 11 downward in the drawing. The sensor part 10 sequentially transfers signal charges, which are obtained through the photo-sensors in the lines, downward (in a direction indicated with arrows A') in accordance with a scan speed. The sensor part 10 sequentially adds the signal charges of the same image with the photo-sensors in the same line to increase the signal charges.

The sensor part 10 is divided into patches 12 that process the signal charges of one line, which are obtained by the photo-sensors, in parallel by means of a plurality of processing systems. The patches 12 are composed of the same circuit, which has the same arrangement of elements, and each patch 12 transfers the signal charge independently.

As stated above, the signal charges are sequentially transferred in the vertical direction, and reach the last stages. Then, the signal charges are sequentially transferred horizontally (in a direction indicated with arrows B), and are output to A/D converters 14, each of which is provided for each patch 12. The A/D converters 14 convert the signal charges into digital signals. Since the data amount to be processed by each of the A/D converters 14 is smaller than in the case where the sensor part 10 is not divided into the patches 12, the data can be processed at higher speed and the image can be scanned at higher speed. As described later, each of the A/D converters 14 comprises a plurality of A/D converters, and the data is further divided to be processed in each patch 12. For this reason, the object can be scanned at higher speed.

Figure 2:
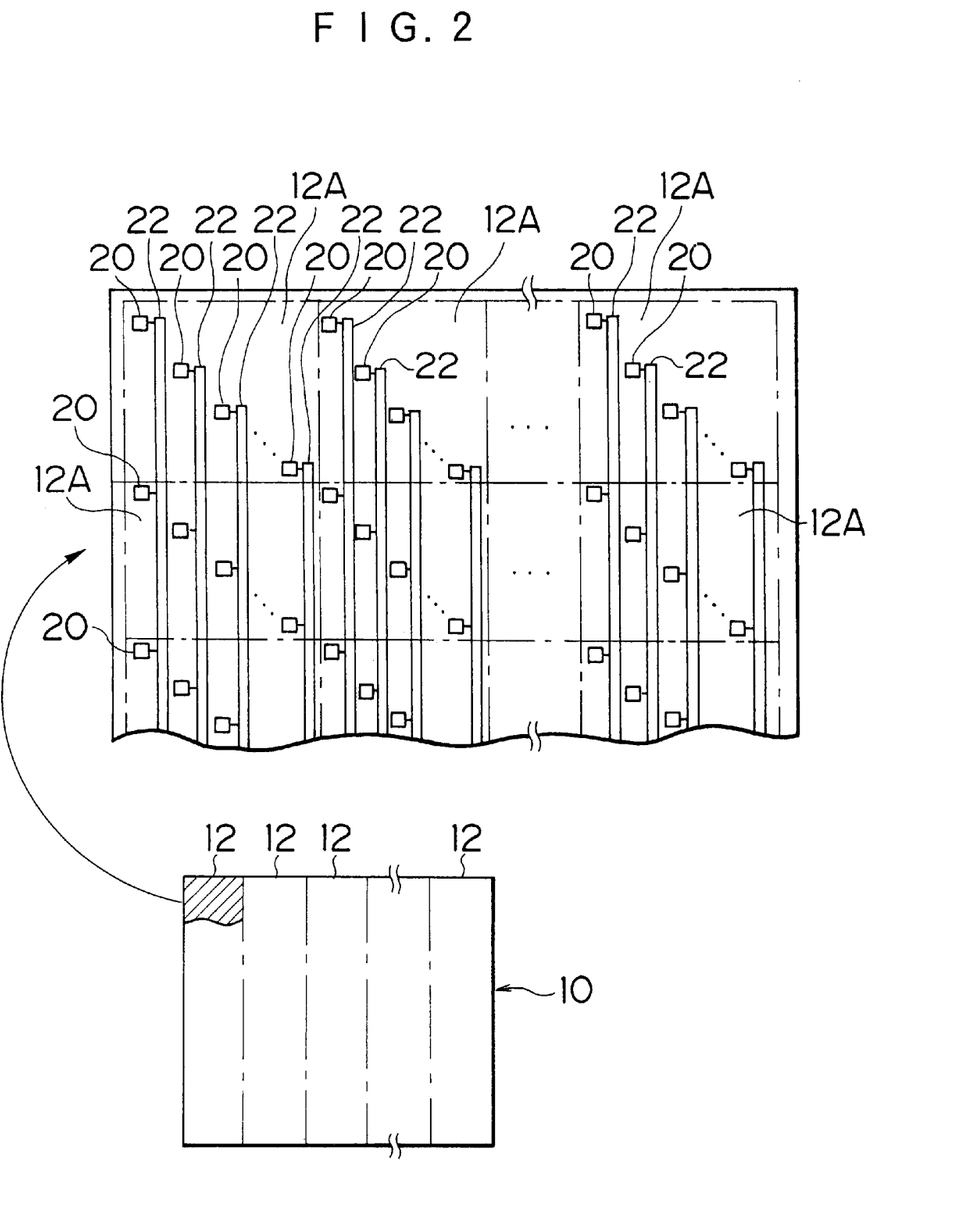
FIG. 2 is a partially-enlarged view of the structure of patches at the sensor part.

A detailed description will now be given of the structure of the image sensor, especially one of the patches 12. FIG. 2 is a partially-enlarged view of the patch 12. A plurality of photo-sensors 20 and a plurality of vertical CCD shift registers 22 are arranged in the patch 12. A basic arrangement of the photo-sensors 20 is shown in each section 12A, and the basic arrangement is repeated lengthwise and widthwise.

Figure 3:
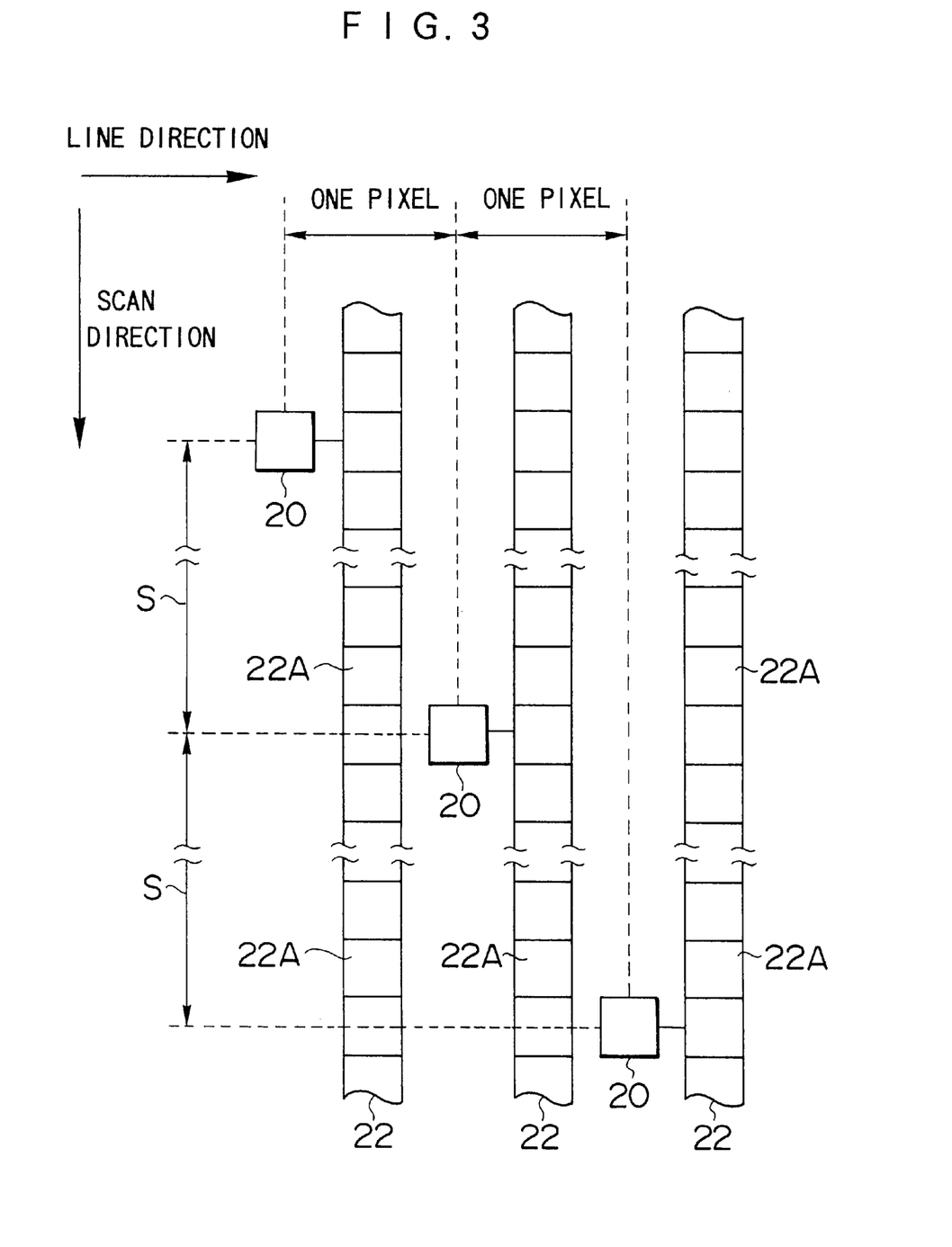
FIG. 3 is a partially-enlarged view of a predetermined section of the patch.

In one section 12A of the patch 12, the photo-sensors 20 are arranged diagonally. Specifically, as shown in FIG. 3, which is a partially-enlarged view of the section 12A, the photo-sensors 20 are arranged at regular intervals that are one pixel in the line direction (horizontal direction) and S lines (stages) in the scanning direction (vertical direction). Every time the image of the object moves by the length of a cell 22A, the signal charge stored in each cell 22A is shifted to the next cell 22A and each photo-sensor 20 captures the signal charge of the image for the next line. Hence, the number of lines in the scanning direction is determined by the number of cells 22A of the vertical CCD shift register 22.

The above-described arrangement of the photo-sensors 20 is not directly related to the high-speed scanning. The above-described arrangement, however, is particularly advantageous when a pinhole is provided at the front of each photo-sensor in order to improve the resolution of the image. In this case, the pinholes must be arranged apart from one another, and the photo-sensors 20 are accordingly arranged apart from one another as shown in FIG. 2. The photo-sensors 20 should not be necessarily arranged as shown in FIG. 2, but they may be arranged in a variety of manners in such a way as to correspond with the pinholes. Moreover, the photo-sensors may be arranged apart from one another regardless of whether the pinholes are used or not, and thus, elements around each photo-sensor 20 can be staggered to thereby enlarge the light receiving area of each photo-sensor 20 so that a large quantity of light can be received.

Figure 4:
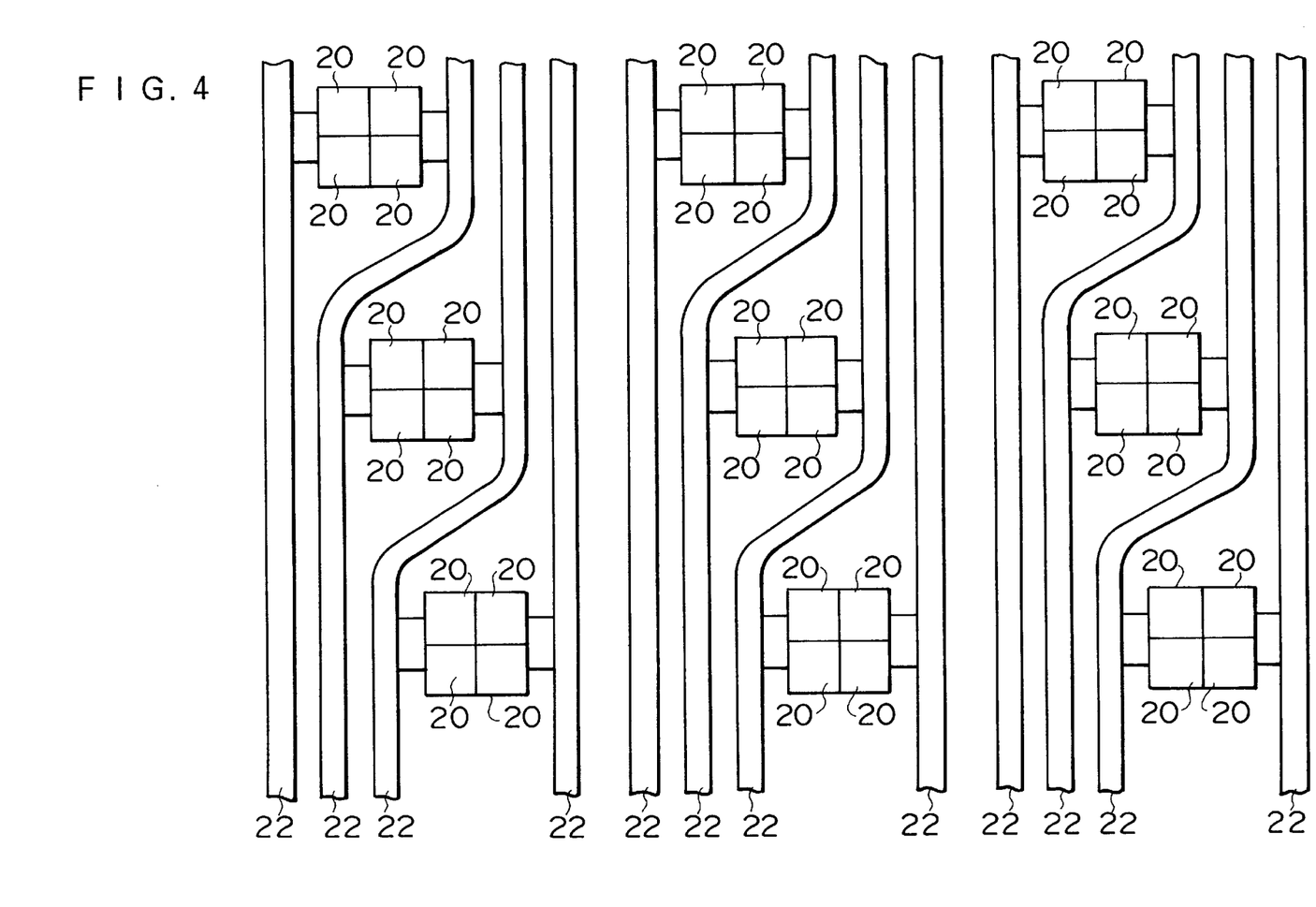
FIG. 4 is a view illustrating an example of an arrangement of photo-sensors.

As shown in FIG. 4, a plurality of photo-sensors 20 may be arranged adjacently. This enlarges the light receiving area at each light receiving point, and converts efficiently the light transmitted through the pinholes into the signal charge without deteriorating the resolution compared with the case where the light receiving area of each photo-sensor 20 is large.

Furthermore, every CCD cell 22A may be conventionally provided with the photo-sensor, if the high-speed scanning is only desired.

The image light entering each photo-sensor 20 is photo-electrically converted into photoelectric current that is stored in a storage electrode (not illustrated) to become a signal charge. When a storage time passes, a shift gate pulse shifts the signal charge to the vertical CCD shift register 22 in the vertical direction. Then, the signal charge is sequentially transferred vertically by a vertical transfer pulse, which is matched with the scan speed. In the CCD cell to which the signal charges are transferred from the photo-sensors 20, the signal charges of the image in the same line are accumulated sequentially. Thus, the signal charges are shifted to horizontal CCD shift registers in the horizontal direction through the vertical CCD shift registers 22.

Figure 5:
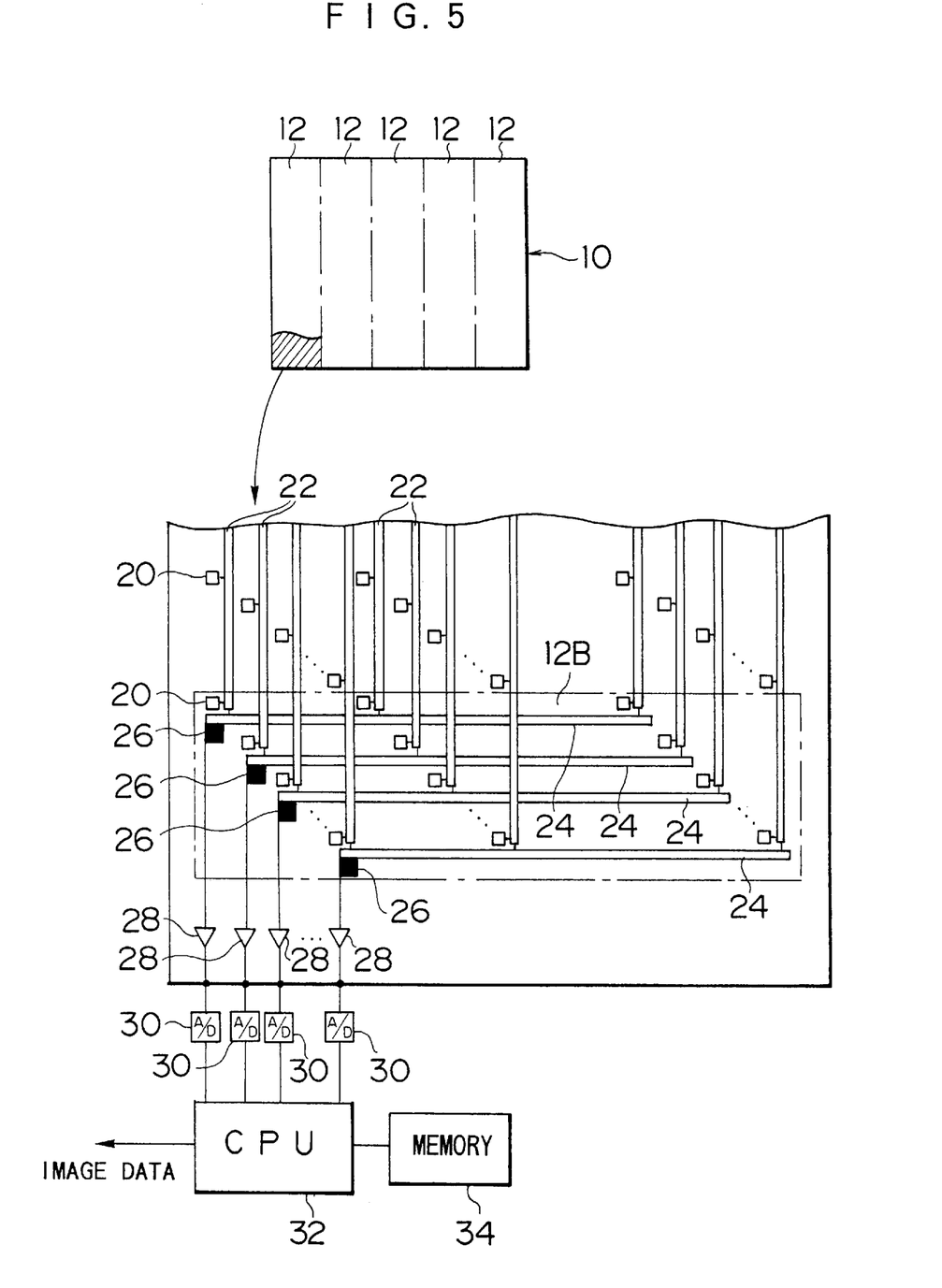
FIG. 5 is a view illustrating the structure of a horizontal CCD shift register provided at the rear part of each patch.

FIG. 5 shows the structure of the horizontal CCD shift registers 24, which are provided at the bottom of the patches 12. As shown in FIG. 5, the horizontal CCD shift registers 24 are provided in a horizontal transfer section 12B, which is located at the end of the basic arrangements of the photo-sensors 20. Each horizontal CCD shift register 24 is provided on each line on which the photo-sensors 20 are arranged.

The signal charge that has been transferred through the vertical CCD shift register 22 is shifted to the horizontal CCD shift register 24 provided at the photo-sensor 20 at the end of each line, and the signal charge is shifted sequentially and horizontally by the horizontal transfer pulse. The signal charges that are discharged from the horizontal CCD shift registers 24 are converted into voltage signals by floating capacitors 26, and then the voltage signals are amplified by preamplifiers 28 and are input to A/D converters 30. The A/D converters 30 convert the voltage signals into the digital signals.

As stated above, in each patch 12, each line on which the photo-sensors 20 arranged in the basic arrangement is provided with the A/D converter 30 converting the signals to digital form. Thus, each A/D converter 30 processes only a small amount of data, and the high-speed scanning can be performed.

The image data of one line is divided into plural pieces of pixel data by the plurality of the horizontal CCD shift registers 24, and the pieces of pixel data are output from the A/D converters 30 at regular intervals. It is therefore necessary to delay the data output from the A/D converters 30 for synthesizing the image data of one line.

A CPU 32 in FIG. 5 receives the digital signals that are output from the A/D converters 30, and stores the digital signals in a memory 34. When the pixel data of one line becomes complete, the CPU 32 reads the pixel data from the memory 34 to synthesize the image data of one line, and outputs the image data to a processing circuit, which is provided next to the CPU 32.

Referring to an image of a certain line, the signal charges of pixels of the image of the certain line move in the scan direction on the CCD cells of the vertical CCD shift registers 22 on the same line. Then, the signal charges are transferred to the horizontal shift registers 24 corresponding to the positions of the pixels. The times when the pixel data is acquired are different between the pixels corresponding to different horizontal CCD shift registers 24 by the time required for transferring the signal charges between the horizontal shift registers 24.

Figure 6:
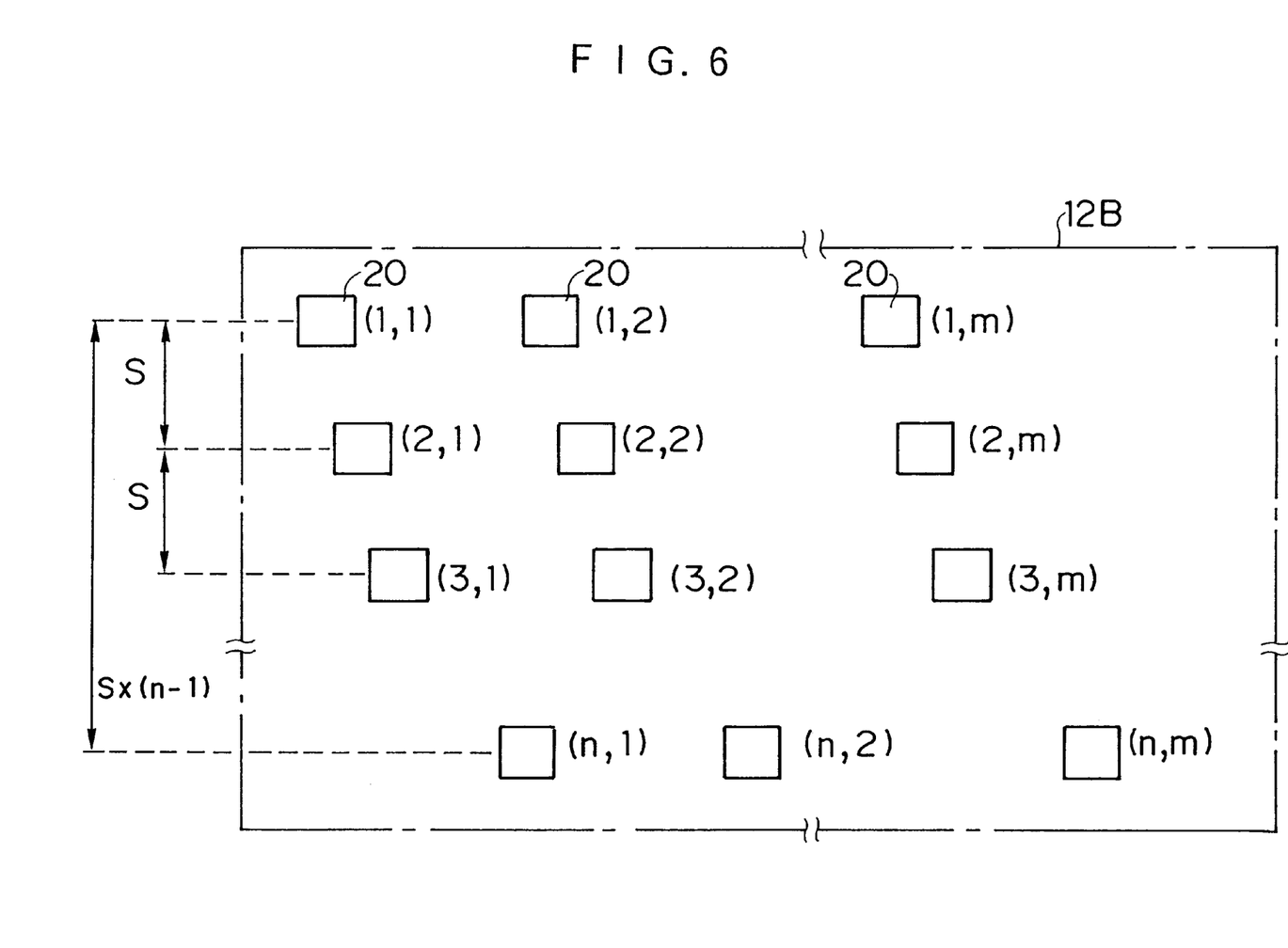
FIG. 6 is a view illustrating an arrangement of photo-sensors in a horizontal transfer section in the patch.

FIG. 6 shows the arrangement of the photo-sensors 20 in the horizontal transfer section 12B. As shown in FIG. 6, the photo-sensor of N-th from the top and of M-th from the left is represented with (N, M). The pixel data that is synthesized from the signal charge at the position of the photo-sensor at the time $T_i$ is represented with (N, M, $T_i$).

If the signal charges of the image of the certain line are located on the top line of the photo-sensors (1, M) at the time $T_i$, the pixel data at the photo-sensors (1, M) is (1, M, $T_i$), where M is an integer from 1 to m. Next, the signal charges of the image of the certain line are transferred onto the line of the photo-sensors (2, M) at the time $T_{i+S}$. $T_i$ is the time when the signal charge is shifted by one line in the scan direction each time i increases by 1, and S is a value of the interval, which is represented with the number of lines, between two photo-sensors 20 adjacent in the scan direction as shown in FIG. 3. The pixel data of the image of the certain line at the photo-sensors (2, M) are (2, M, $T_{i+S}$). Likewise, the signal charges of the image of the certain line are transferred on the last line of the photo-sensors (n, M) at the time $T_{i+S(n-1)}$, and the pixel data of the image of the certain line at the photo-sensors (n, M) are (n, M, $T_{i+S(n-1)}$).

Then, the pixel data on the same line consists of the pixel data of (N, M, $T_{i+S(n-1)}$), where N is an integer from 1 to n, and M is an integer from 1 to m. The CPU 32 extracts the image data represented with (N, M, $T_{i+S(n-1)}$) from the image data stored in the memory 34 to thereby synthesize the image data (the image signal) of the one line.

Thus, the image data is acquired in each patch 12. The obtained image data of the patches 12 is united to synthesize the image data of the sensor part 10 as a whole.

Figure 7:
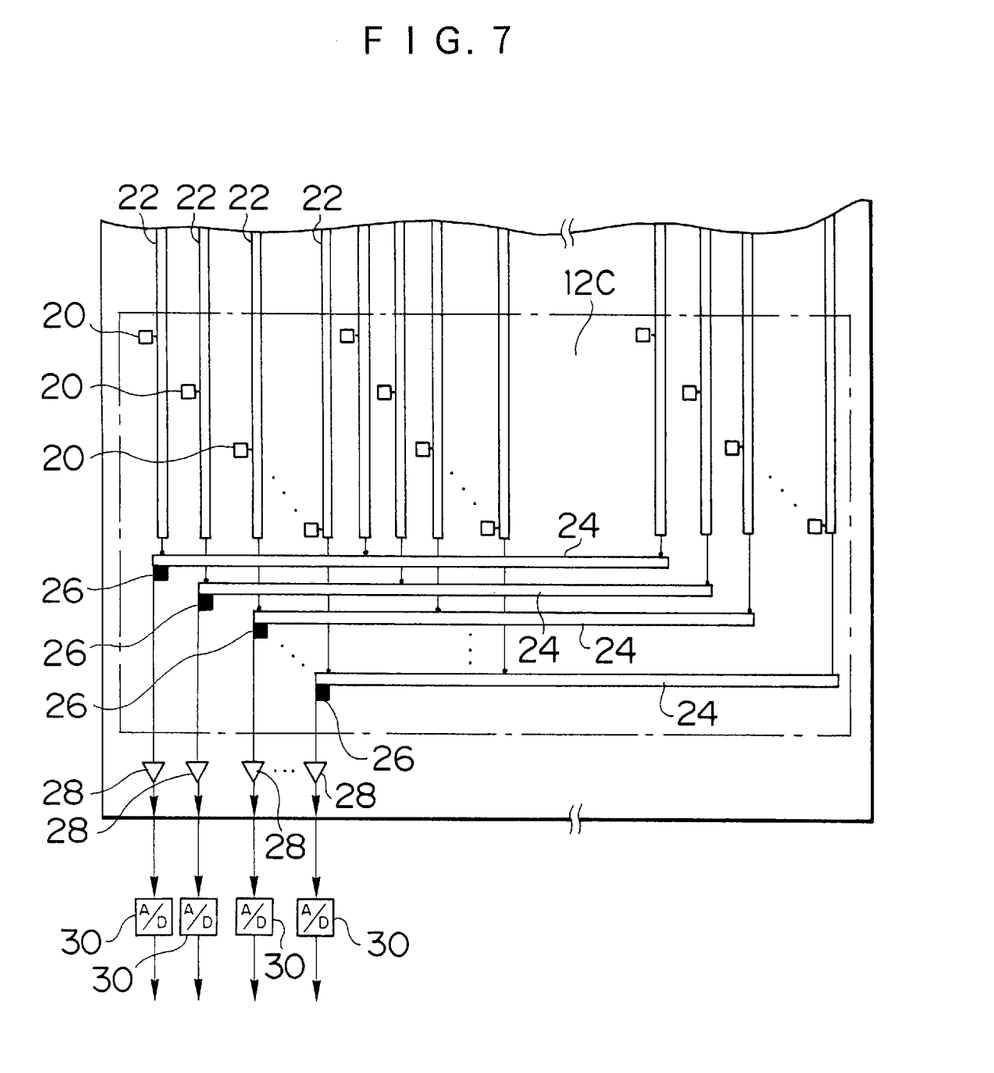
FIG. 7 is a view illustrating the structure of a horizontal CCD shift register provided at the rear part of each patch.

In this embodiment, the pixel data of the image on the same line is acquired through the horizontal CCD shift registers 24 at regular intervals, but the present invention is not restricted to this. The horizontal transfer section 12B in FIG. 5 may be replaced with a horizontal transfer section 12C in FIG. 7 so that the signal charge in each line can be transferred to the last line by the vertical CCD shift registers 22. In this case, the signal charges of the image on the same line are transferred to the horizontal CCD shift registers 24 at the same time, and therefore, the pixel data of the image on the same line can be acquired at the same time.

Figure 8:
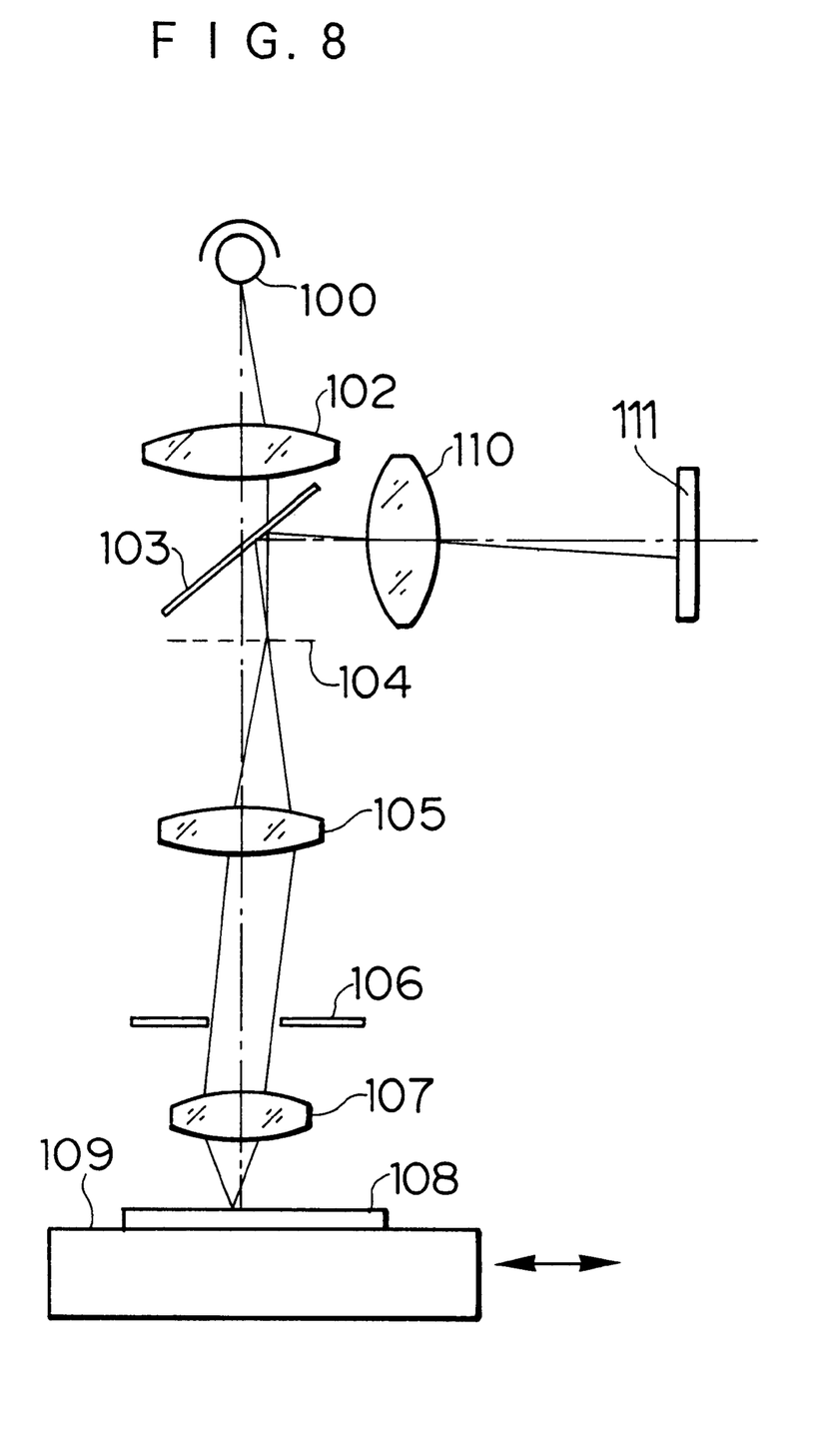
FIG. 8 is a view illustrating the structure of a confocal microscope to which the image sensor of the present invention is applied.

The image sensor of the embodiment may be utilized as an imaging device in a confocal microscope used in an inspection machine, which determines whether patterns drawn on a semiconductor wafer are satisfactory or not. FIG. 8 shows the structure of the confocal microscope. Reference numeral 100 is a light source for emitting illumination light; 102 is a condenser lens for directing the illumination light uniformly; 103 is a separation mirror for separating the illumination light and object light; 104 is a diaphragm array provided with a number of transparent areas or pinholes; 105 and 107 are a tube lens and an objective lens that have focal planes at a position where the diaphragm array 104 is arranged and a position where an object (a wafer) 108 is placed, respectively; 106 is a telecentric diaphragm; 109 is a scanning table, which can be electrically moved in two directions vertical with respect to the optical axis; 110 is a projection lens, which projects an image of the plane of the diaphragm array 104; and 111 is a TDI sensor, which picks up the image projected through the projection lens 110. If the present invention is applied to the TDI sensor 111, the photo-sensors 20 (see FIG. 3) are arranged in such a way as to match the pinholes of the diaphragm array 104, and the photo-sensors 20 receive the object light through the pinholes of the diaphragm array 104. Then, the scanning table 109 is moved to move the object 108, and the signal charges that are accumulated in the cells 22A (see FIG. 3) of the vertical CCD shift registers 22 in the TDI sensor 111 are shifted in synchronism with the movement of the object 108.

As set forth hereinabove, the image sensor of the present invention transfers the signal charges, which are read from the photo-sensors, in the scan direction in accordance with the scan speed, and accumulates the signal charges representing the same image that are read from the photo-sensors on the same line. Then, the image sensor sequences the signal charges of every a predetermined number the lines in the line direction, and transfers the signal charges in a plurality of signal charge lines in the line direction to the A/D converters. The A/D converters separately convert the signal charge lines into the digital signals, from which the image signals are generated. Thus, the signal charge line representing the image of one line can be converted into the digital signal by the plurality of processing circuits. Hence, one processing circuit processes only a small amount of data, and the object can be scanned at high speed.

Moreover, the photo-sensors are arranged at intervals of more than predetermined distance at the light receiving part, and thus, the light receiving surface of each photo-sensor can be enlarged by shifting the peripheral circuits. As a result, the quantity of light received by each light receiving surface can be increased.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image sensor comprising:

a light receiving part having photo-sensors, the photo-sensors receiving object light and converting the object light into signal charge, the photo-sensors being arranged in a plurality of lines in a line direction and being arranged in a plurality of lines in a scan direction perpendicular to the line direction;

a plurality of scan direction signal charge transfer parts for transferring the signal charge, read from the photo-sensors, in the scan direction in accordance with a scan speed and accumulating the signal charge representing the same image read from the photo-sensors in the same line, each of the scan direction signal charge transfer parts being provided for each line of the photo-sensors in the scan direction;

a plurality of line direction signal charge transfer parts for transferring the signal charge, transferred through the scan direction signal charge transfer parts, in the line direction, each of the line direction signal charge transfer parts connecting with every a predetermined number the scan direction signal charge transfer parts;

a plurality of digitizing parts for converting a plurality of signal charge lines, transferred through the line direction signal charge transfer parts, to digital signals; and an image signal producing part for producing image signals according to the digital signals output from the digitizing parts.

2. The image sensor as defined in claim 1, wherein the photo-sensors of the light receiving part are arranged at intervals of more than a predetermined distance.

3. The image sensor as defined in claim 1, wherein the photo-sensors of the light receiving part form groups, the photo-sensors being adjacently arranged in each group, and the groups of the photo-sensors are arranged at intervals of more than a predetermined distance.

4. The image sensor as defined in claim 1, wherein the image sensor is used as imaging means for imaging an object observed through a confocal microscope.

\* \* \* \* \*